United States Patent [19]
Rackman
[11] 3,778,553
[45] Dec. 11, 1973

[54] ATTACHMENT FOR FACILITATING USE OF A PUSH-BUTTON TELEPHONE SET AS A DATA TERMINAL

[76] Inventor: Michael I. Rackman, 1710 Glenwood Rd., Brooklyn, N.Y. 11230

[22] Filed: Apr. 5, 1972

[21] Appl. No.: 241,307

[52] U.S. Cl. .............. 179/2 DP, 340/365, 179/90 K
[51] Int. Cl. .......................................... H04m 11/06
[58] Field of Search .............. 179/2 DP, 2 R, 90 CS, 179/90 K, 84 VF, 90 AD; 340/365 R; 235/145, 146

[56] References Cited
UNITED STATES PATENTS

| | | | |
|---|---|---|---|
| 3,557,311 | 1/1971 | Goldstein | 179/2 DP |
| 3,194,893 | 7/1965 | Auel | 179/90 CS |
| 3,627,936 | 12/1971 | Cullen | 340/365 R |
| 3,634,631 | 1/1972 | Youngs | 179/90 CS |
| 3,675,513 | 7/1972 | Flanagan et al. | 179/84 VF |
| 3,618,038 | 11/1971 | Stein | 179/2 DP |
| 3,573,376 | 4/1971 | Bartlett | 179/2 DP |
| 3,647,973 | 3/1972 | James | 179/2 DP |

*Primary Examiner*—Kathleen H. Claffy
*Assistant Examiner*—Thomas D'Amico
*Attorney*—George Gottlieb et al.

[57] ABSTRACT

An attachment for a push-button telephone set which fits directly over the ten (or twelve) telephone push-buttons. On top of the attachment there is provided a separate push-button for each letter and digit. Whenever one of the attachment push-buttons is pressed down, two telephone set push-buttons are pressed down in succession so that a two-digit code is transmitted for each letter or digit without requiring the user to operate two telephone set push-buttons in succession to distinguish between letters and digits.

20 Claims, 11 Drawing Figures

ATTACHMENT FOR FACILITATING USE OF A PUSH-BUTTON TELEPHONE SET AS A DATA TERMINAL

This invention relates to telephone attachments and more particularly to an attachment to be fitted over a push-button telephone set to facilitate use of the set as a data terminal.

Push-button telephones, such as ATT's Touch-Tone sets, at the present time are used primarily for voice communication, and the ten (twelve, in some cases) push-buttons on a phone are used primarily for "dialing" a party. But more and more it is becoming apparent that the push-buttons will be used for transmitting data as well as for dialing purposes.

To communicate with a computer (or, in general, to transmit data) an end of the communication link must be provided with a data terminal. The two most popular types of data terminals are Teletype machines and CRT displays (such as those used at airline reservation desks). Each of these types of data terminals has a full keyboard (like a typewriter's) for transmitting data to a computer. To present data received back from the computer, the Teletype machine types it out and the CRT terminal displays it on a screen. Both types of data terminals are very expensive.

A very cheap data terminal is the ordinary telephone because it is usually already available. Data can be transmitted by operating the push-buttons, and data can be received by listening to a spoken response. One application of the use of telephone data terminals is in banking. A teller, who wants to know if a depositor has a sufficient balance to cover a check to be cashed, instead of looking up a record, can simply dial a computer, key in the depositor's name or code number, and then listen to the computer response. Another application is credit card verification; a store clerk dials the credit-card company computer, followed by the dialing of the customer's credit card number, and then listens to a verbal report. Other applications include requests for the progress of air freight shipments, requests by a factory manager for the number of parts in inventory, requests to a computation center for estimated time of processing of computer programs, etc.

The equipment which enables a computer to send back a verbal message is called a "voice response" system. Typically, such a system has several hundred prerecorded words. The computer composes a message to be delivered and then controls the recording equipment to play back over the telephone line the selected words in the proper sequence.

A conventional push-button phone is fine when it comes to receiving a verbal message back from a computer. But it has one major shortcoming when used to transmit a message to the computer.

Most of the buttons represent four characters — a respective digit and three letters. For example, the digit 6 and the letters M, N and O appear on the sixth button. The letters are superfluous insofar as the telephone system is concerned. The telephone system responds to the digit information only — the operation of every push-button is interpreted by the telephone central office as representing one of the 10 digits. The letters of the alphabet are included on the push-buttons only because it is easier to remember a seven-digit telephone number by thinking of two of the digits as letters. It is easier to remember GE 8–5716 than it is to remember 438–5716. The user may think he is dialing a G and an E, but the telephone central office treats them as 4 and 3 respectively.

Data communication, however, often requires the transmission of letters as well as digits; a G is not the same as a 4. Since each button represents four different items of information, the problem is how to inform the computer of the intent of the user. For example, if a customer identification code is KM7, the user would operate buttons (5,L,K,J), (6,M,N,O) and (7,P,R,S) in succession, but the computer has no way of knowing that the transmitted information really is KM7. It might be L6R, 5N7, etc.

The current procedure for identifying a particular character is the following. To transmit any letter or digit, two buttons must be operated in sequence. For example, consider button (6,M,N,O). The user is told that if he wishes to transmit a 6, he must press button 6, followed by button 1; if he wishes to transmit an M, he must operate button 6 followed by button 2; if he wishes to transmit an N, he must operate button 6 followed by button 3; and if he wishes to transmit an O he must operate button 6 followed by button 4. A similar two-button sequence must be used to transmit any letter or digit. The computer interprets each two-button sequence as a unique letter or digit. The problem with this approach is apparent — it is not only very inconvenient but it also leads to numerous errors (and therefore erroneous messages delivered to the computer).

It is an object of this invention to provide an attachment for a push-button telephone set which overcomes the aforesaid data communication problems.

Briefly, in accordance with the principles of my invention, I provide a small box attachment which clips on to a push-button telephone set directly above the push-buttons. The telephone buttons are thus hidden from view. At the top of the attachment there are a minimum of 36 buttons — each for representing only one digit or only one letter. At the bottom of the attachment there is a plunger on top of each telephone set button; when a plunger is pushed down, the associated telephone set button is pushed down. When any button on top of the attachment is pushed down, the attachment causes two of the plungers to be pushed down in succession. For example, in the illustrative case above, if the user wishes to transmit an M, he pushes button M on top of the attachment. When he does this, the attachment causes telephone button 6 to be depressed, followed by telephone button 2. The pushing of any of the 36 buttons on the attachment causes a respective two of the telephone buttons to be pushed down in sequence. In effect, the attachment does automatically what the user now does manually — it operates two telephone buttons for each digit or letter to be transmitted. But the user is not at all involved in the process; all he has to do is to depress the particular button on top of the attachment which is labelled with the letter or digit that he wishes to transmit.

If the attachment has a fixed code, the user and the dialed computer center cannot select a code of their own. For example, if to transmit an N the attachment is made so that telephone buttons 6 and 3 are pushed down in sequence, the computer which receives the data must be programmed to interpret a 6 followed by a 3 as an N. This is a trivial programming matter, but it does mean that all computers with which the user can communicate have to be programmed to interpret the same code. In the illustrative embodiment of the invention, provision is made for code interchange. The user is furnished with printed circuit cards which can be slipped in and out of the attachment. Each card changes the internal code. For example, the card for one computer might control a 6–3 sequence for the letter N, while the card for another computer might control a 6–1 sequence. Prior to using the attachment, the user simply slips in the card associated with the computer with which he desires to communicate.

Further objects, features and advantages of the invention will become apparent upon consideration of the following detailed description in conjunction with the drawing, in which.

Figure 4:
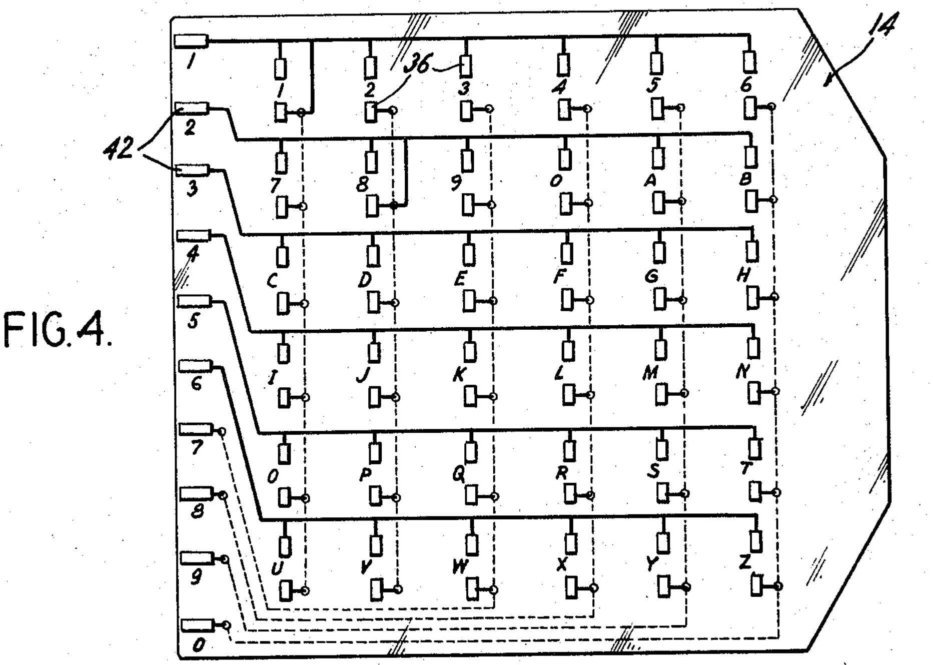
FIG. 4 depicts the lay-out of an illustrative printed circuit card 14 which can be inserted into the attachment of my invention.
Figure 5:
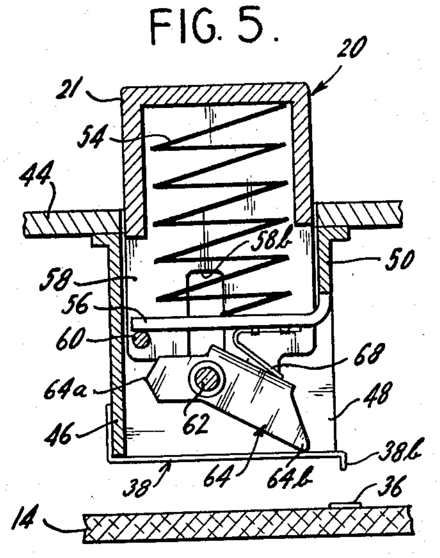
Figure 6:
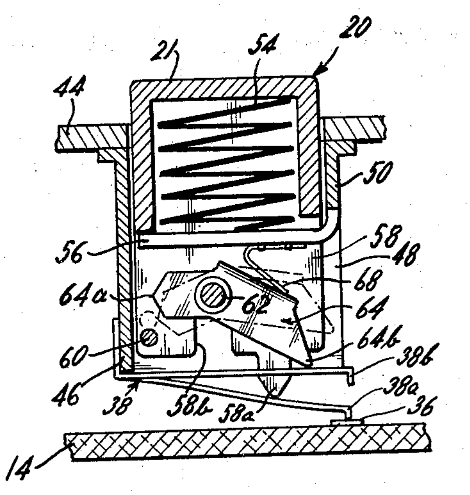
Figure 7:
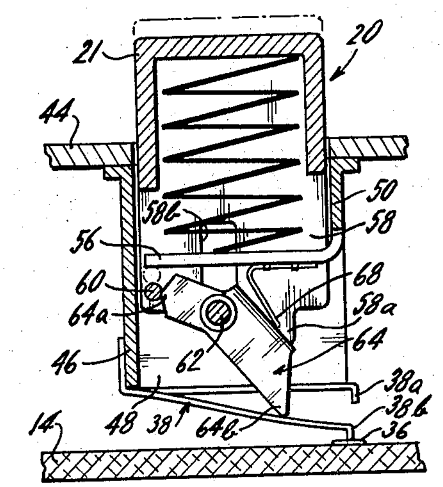
Figure 8:
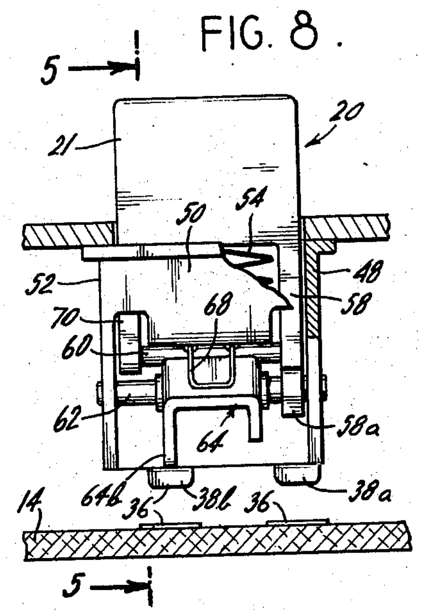
Figure 9:
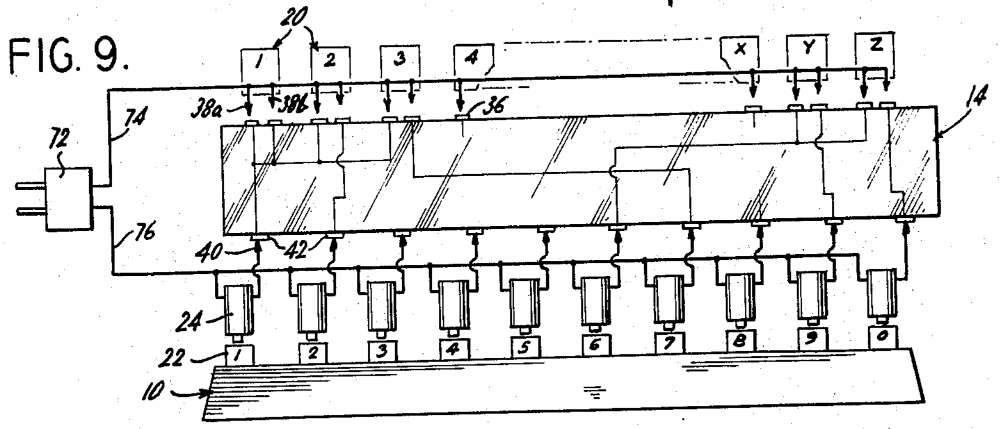
Figure 10:
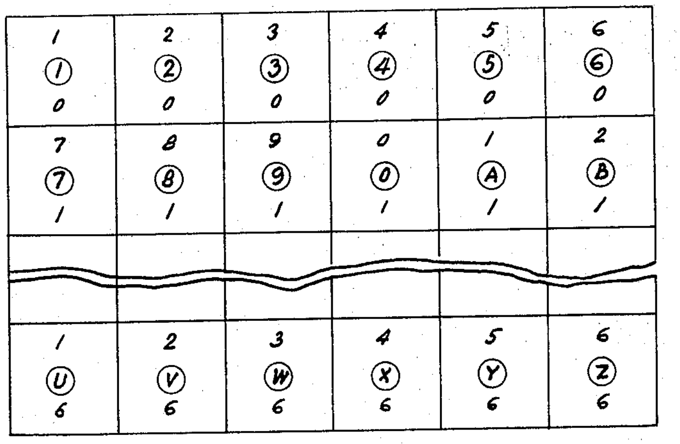
Figure 11:
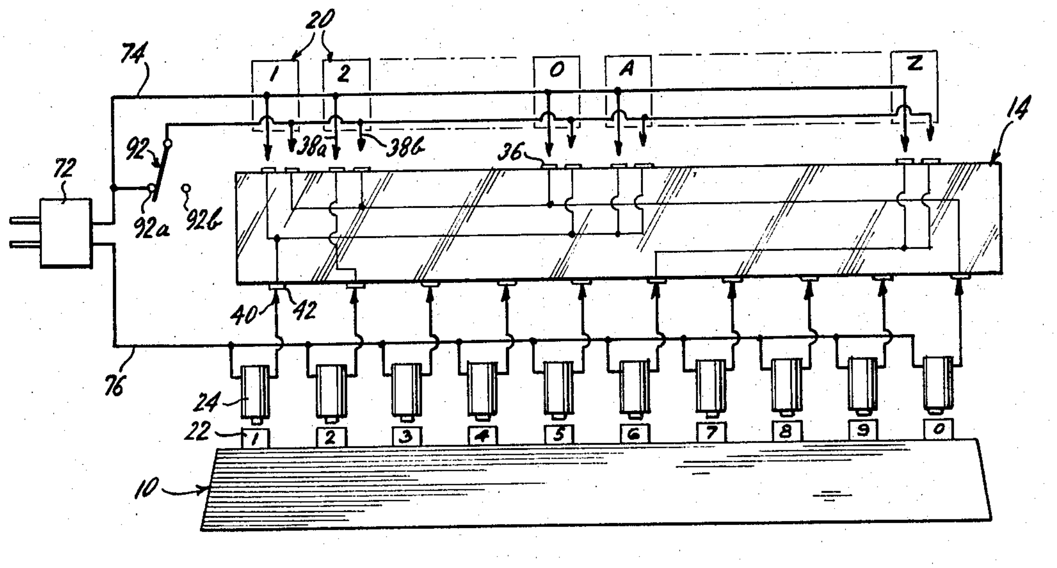

FIG. 5 is a sectional view taken through the line 5—5 of FIG. 8 which depicts an individual one of the 36 button elements 20 in the telephone attachment, and shows the button element in its normal position;

FIG. 6 is a sectional view similar to that of FIG. 5 but depicts the button element when the button is pressed down fully;

FIG. 7 is a view similar to that of FIGS. 5 and 6 and depicts the button element as the button is returning to its normal position;

FIG. 8 is a side view of the button element, shown partially broken away, when the button is in its normal position;

FIG. 9 depicts the wiring circuit for an attachment utilizing the card of FIG. 4;

FIG. 10 depicts the coding for another card which allows the attachment of my invention to be used for ordinary telephone dialing as well as data transmission; and FIG. 11 depicts the wiring diagram for an attachment utilizing the card of FIG. 10.

Figure 1:
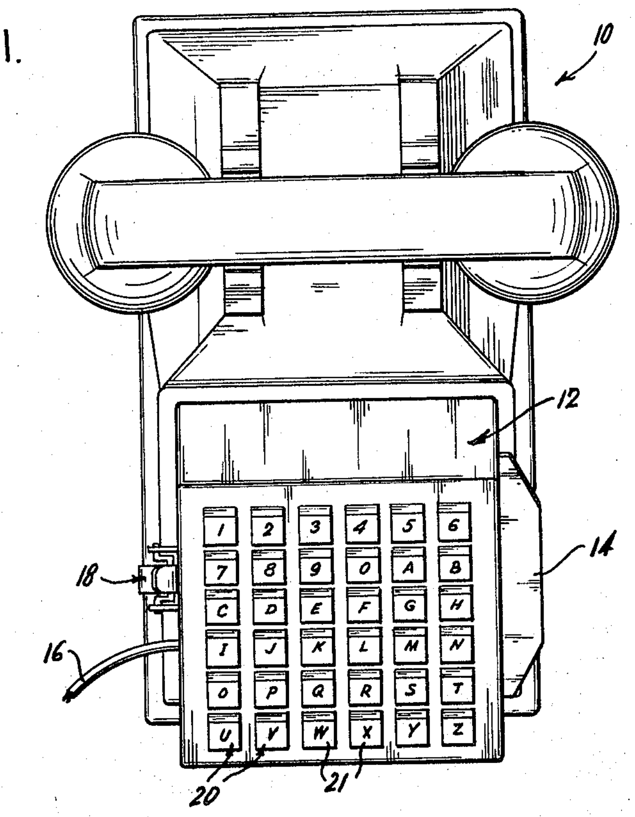
FIG. 1 is a top view of a conventional push-button telephone set with the attachment of my invention placed thereon.
Figure 2:
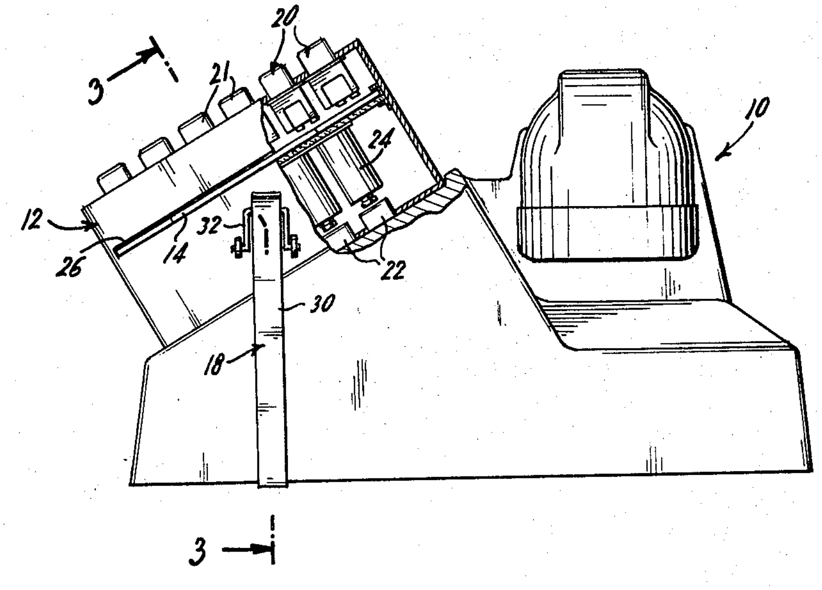
FIG. 2 is a side view, shown partially broken away, of the telephone set and attachment of FIG. 1.
Figure 3:
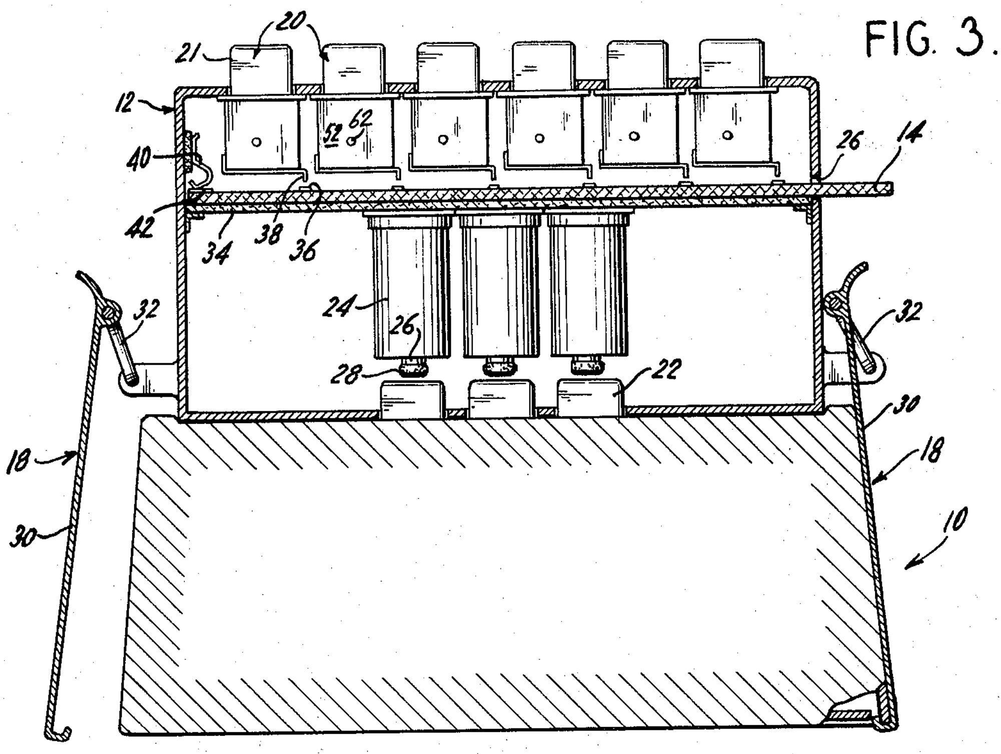
FIG. 3 is a sectional view taken through the line 3—3 of FIG. 2.

As seen most clearly in FIGS. 1–3, attachment 12 is placed over the 10 push-buttons on a conventional push-button telephone set. A hole is provided in the base of the attachment so that each of the telephone push-buttons can extend into the attachment. (In the case of 12-button telephone sets, the attachment would include twelve cut-outs in its bottom face so that the attachment can be fitted on the telephone set. Similarly, with 12 push-buttons, 12 solenoids of the type to be described below might be provided so that all twelve of the telephone push-buttons might be operable if desired.) The attachment is secured to the telephone set by two straps 30, shown most clearly in FIG. 3, the straps being coupled to brackets on the attachment by toggle linkages 32. To remove the attachment, the two toggle linkages are moved outward (as shown for the leftmost linkage of FIG. 3); to secure the attachment to the telephone set, the hook at the bottom of each of straps 30 is fitted over the bottom edge of the telephone set, and each toggle linkage is then moved inward (as shown for the rightmost linkage of FIG. 3).

The attachment includes 36 push-button mechanisms 20 which are labeled 1–0 and A–Z. Inside the attachment, as seen most clearly in FIGS. 2 and 3, ten solenoids 34 are provided, each disposed over a respective one of the ten telephone set push-buttons which extend into the attachment. The end of each plunger 26 of a solenoid has attached to it a felt pad 28 so that when the solenoid is operated and the plunger strikes a telephone push-button, any resulting noise is muffled. Power for the solenoids is derived over a cord 16, as shown in FIG. 1.

A slot 26 is provided in one side of the attachment so that a printed circuit card 14 can be inserted into the attachment and removed therefrom. An insulating plate 34 is provided for supporting the printed circuit card. The card is depicted most clearly in FIG. 4. Two contacts 36 are located at each of the 36 positions which are labeled 1–0 and A–Z. On the left side of the card there are ten contacts 42 labelled 1–0. As shown most clearly in FIG. 3, ten spring contacts 40 are provided for engaging the ten contacts 42 on the left side of card 14 when the card is fully inserted into the attachment. Each of the ten contacts 40 is connected to the winding of a respective solenoid by a wire (not shown), as will be described below in connection with the wiring diagram of FIG. 9.

The printed circuit card functions to connect the two contacts 36 associated with each of the attachment push-button positions to one of the ten contacts 42. In FIG. 4, the solid lines represent conducting paths on the top surface of the card, the dotted lines represent conducting paths on the bottom surface of the card, and the circles represent through-holes for connecting an upper-surface conducting path to a lower-surface conducting path. Also, of the two contacts 36 at each of the push-button positions on card 14, the upper contact is the one which, as will be described below, is the first to have a solenoid energizing potential applied to it. For example, the upper contact in FIG. 4 associated with position E is connected to the contact 42 which is labeled 3, and the lower contact at position E is connected via a conducting path on the under surface of the printed circuit card to the contact 42 which is labelled 7. When push-button E on the top of the attachment is pressed down, the solenoid over the telephone set push-button number 3 is first actuated, followed by the actuation of the solenoid which is positioned over the telephone set push-button number 7. The wiring of the circuit card is such that a different two-solenoid sequence is provided for each of the 36 attachment push-buttons. Thus if a computer with which the telephone set is in communication receives the tones which represent a 3 followed by the tones which represent a 7, it interprets this sequence as representing the letter E. The coding on card 14, of course, must be such that it is compatible with the code which the computer expects to receive for each letter and digit.

Each push-button mechanism as shown in FIGS. 5–8 has two leaf contacts **38*a* and 38*b* at the bottom thereof. The button enclosure is made of plastic so that the two separated contacts can be mounted on it without being short-circuited to each other. When a card is fully inserted into the attachment, the tip of contact 38*a* on each push-button mechanism is disconnected from, but is disposed directly above, the upper-most one of the respective two contacts 36 represented on the circuit card of FIG. 4, and the tip of the paired contact 38b is disposed directly above the lower-most contact represented in FIG. 4 at the same position. A solenoid is actuated when one of the two leaf contacts on any push-button mechanism is forced down so as to engage a contact on the circuit card. For example, with reference to the push-button mechanism 20 which is labelled E on the attachment, when the button is pushed down contact 38a on this mechanism first engages the contact on circuit card 14 at position E which is coupled to that one of contacts 42 which is labelled 3, and contact 38b on this mechanism is then forced down to engage the second contact at position E on the circuit card which is connected to that one of contacts 42 which is labelled 7. Thus when push-button E is pushed down, solenoids 3 and 7 are actuated in succession; this, in turn, causes the telephone set push-button number 3 to be pressed down and then released, followed by the pushing down and then the release of the telephone set push-button number 7**.

Each push-button mechanism includes a square-shaped enclosure having four sides 46, 48, 50 and 52. The enclosure is secured to the underside of upper plate 44 of the attachment, and side 50 is bent inwardly with the bent end being labelled 56. A spring rests on top of the inwardly bent section 56 and bears against the bottom of the push-button 21 itself. As the push-button is pressed down the spring is compressed, and when the push-button is released the spring forces it to return to the original position shown in FIGS. 5 and 8.

Two brackets 58 and 70 extend down from two opposite sides of push-button 21. A rod 60 is held in place at the bottom of each of the brackets. Furthermore, bracket 58 is provided with a projection 58a at the bottom thereof which is shown most clearly in FIG. 6. This projection is disposed directly above leaf contact 38a and, as shown in FIG. 6, when the push-button is pressed down, and the two brackets 58 and 70 move down against the force of spring 54, projection 58a bears against leaf spring 38a and forces it down so that it engages the paired contact on the printed circuit card. When the push-button is released, leaf spring 38a restores to its normal position with the return of button 21.

The rod 62 is held fixed in sides 48 and 52 of each square-shaped enclosure. Although each of brackets 58 and 70 is forced down when the push-button is pressed, the brackets do not interfere with rod 62 because each of the brackets is provided with a cut-out such as 58b shown in the drawing. However, the rod 60 which is fixed to brackets 58 and 70 does make contact with end 64a of lever 64 when the push-button is first pressed down. The lever 64 is axially fixed on the rod 62 in the position shown in FIG. 8, but it can rotate around the rod. On one side of the lever, as seen most clearly in FIG. 8, there is an extended end 64b which is disposed directly above leaf contact 38b. A weak spring 68 is fixed to the underside of stationary element 56 and bears against the upper surface of lever 64 as shown in the various figures.

When the push-button is depressed, rod 60 is forced downward since it is carried by brackets 58 and 70 which are fixed to the push-button. The rod engages the tip 64a of lever 64 and rotates it in the counter-clockwise direction as shown in phantom in FIG. 6. The positions of the rod and the lever which are shown in phantom in FIG. 6 are those assumed when the lever has been rotated to the maximum extent in the counter-clockwise direction. As the push-button is pushed down even further to its final position shown in FIG. 6, rod 60 clears projection 64a of the lever. While the lever was rotating in the counter-clockwise direction, spring 68 was compressed. As soon as rod 60 clears projection 64a, spring 68 forces the lever to return to its initial position as shown in both FIGS. 5 and 6. By the time the push-button has been fully depressed, projection 58a on bracket 58 has forced leaf contact 38a downward so that it engages the respective one of printed circuit card contacts 36. FIG. 6 shows the engagement being made, and lever 64 after it has returned to its initial position following its counter-clockwise displacement. Downward movement of the button is limited by contact with bent element 56, as seen in FIG. 6.

When the push-button is released by the user, spring 54 forces it to rise. As soon as the push-button has moved slightly upward, projection 58a of bracket 58 no longer forces leaf contact 38a against the respective one of contacts 36, and the first solenoid to have been actuated is de-energized. As the push-button continues in its upward movement, rod 60 once again bears against tip 64a of lever 64 but this time it bears against the bottom edge of the lever and forces the lever to rotate in the clockwise direction around rod 62. This, in turn, causes lower tip 64b of the lever to bear against leaf contact 38b and to thus engage the respective one of contacts 36 on the printed circuit card as is seen most clearly in FIG. 7. As the push-button continues to return all the way to its initial position, rod 60 moves to the position shown in phantom in FIG. 7. Upward movement of the button is limited by rod 60 bearing against bent element 56. At this time the rod no longer bears against tip 64a of the lever, and leaf spring 38b returns to its normal position. In so doing, it forces lever 64 to return to its initial position as shown in FIGS. 5, 6 and 8.

It is thus apparent that each push-button mechanism first causes its respective leaf contact 38a to engage one of the two contacts on the printed circuit card at the respective position, followed by the engagement of the respective leaf contact 38b with the other contact at the same position on the printed circuit card.

FIG. 9 depicts the wiring diagram for the illustrative attachment of the invention. Each of push-button mechanisms 20 is shown only symbolically as having two leaf contacts 38a and 38b. All of the leaf contacts are connected to wire 74. Converter 72 is a conventional unit for insertion into a wall socket and it functions to convert the AC line power to a DC potential which appears across conductors 74 and 76. It is the latter two conductors which are extended to the attachment over cord 16 of FIG. 1. Conductor 76 is connected to one end of the winding of each of the ten solenoids 24. The other end of each solenoid winding is connected over wires (not shown in the other figures) to the respective one of contacts 40 (see FIG. 3) and these contacts in turn engage the ten contacts 42 on the printed circuit card (which are shown in both FIGS. 4 and 9). The printed circuit card 14 in FIG. 9 depicts only some of the connections effected by it. For example, suppose that push-button number 3 on top of the attachment is pressed down. Its leaf contact 38 *a* first bears against the uppermost one of the two printed circuit card contacts shown at position 3 in FIG. 4, and it is seen that this contact is connected to that one of the contacts 42 on the card which is labelled 1. Thus the potential on conductor 74 is extended through the respective contact 38*a* and the card to that one of spring contacts 40 which is connected to one end of the widing of solenoid number 1. Thus this solenoid is first actuated. After the push-button is released and contact 38*a* springs back to its initial position, the first solenois which is operated de-energizes. (This is important because there should be some time gap between solenoid energizations; the solenoids should operate in non-overlapping time succession.) As the push-button continues in its upward movement, as symbolized in FIG. 9 its leaf contact 38*b* engages a contact 36 at position 3 of the circuit card which is coupled to that one of contacts 42 which in turn is connected to one end of the winding of solenoid number 7. As seen in FIG. 4, the lower contact at position 3 (the contact which is engaged by the respective leaf spring 38*b*) is coupled through the card to that one of contacts 42 which is coupled to the winding of solenoid 7. Thus when the push-button is released, solenoid number 7 is actuated. As soon as the push-button has been fully restored to its initial position, leaf spring 38*b* restores to its initial position and solenoid number 7 is de-energized.

In order to utilize the attachment thus far described, the operator may first establish a connection to the desired computer simply by making an ordinary telephone call, that is, by operating seven (or more) push-buttons on the telephone set. After communication with the computer is established, the attachment of my invention is placed over the phone and data communication proceeds by operating the push-buttons on top of the attachment. The attachment described above cannot be used in most cases for ordinary telephone dialing because the operation of each attachment push-button causes tones which represent two successive digits to be transmitted to the telephone central office. However, it is possible, with a slight modification of the unit, to allow the attachment to be used for ordinary dialing as well as for data communication purposes.

In this regard, the printed circuit card which should be utilized should be coded along the lines represented in FIG. 10. The only codes of interest are those associated with those ten of the 36 attachment push-buttons which are labelled 1–0 and accordingly FIG. 10 depicts the codes only for these ten push-buttons (and eight others). The circled numeral or letter in the middle of each box represents the letter or digit printed on the push-button at the top of the attachment (as shown in FIG. 1). The upper digit in each box represents the number of the solenoid which is first actuated when the attachment push-button is depressed. For example, when button number 4 on the attachment is pressed down, solenoid number 4 in the attachment is actuated and button number 4 on the telephone set is depressed. The lower digit in each box of FIG. 10 represents the second solenoid which is actuated whenever the respective push-button is operated. Insofar as the embodiment of the invention shown in FIGS. 10 and 11 is concerned, the only coding of interest is the first one of the telephone set push-buttons which is pressed down when the same-numbered attachment push-button is pushed down.

The wiring for the attachment with which a card such as that shown in FIG. 10 can be used is shown in FIG. 11 and is very similar to the wiring shown in FIG. 9. The only difference is that while all of contacts 38*a* in the 36 push-button mechanisms are again connected to conductor 74, all of contacts 38*b* are connected to a separate conductor. This conductor is connected to one end of switch 92, the other end of which can be coupled to either terminal 92*a* or terminal 92*b*. Terminal 92*b* is floating while terminal 92*a* is connected to conductor 74. Switch 92 is mounted on top of the attachment in any conventional manner (although not shown in the drawing).

When switch 92 is in the position shown in FIG. 11, it is apparent that the potential on conductor 74 is extended to the 36 contacts 36*a* and the 36 contacts 36*b* just as it is in the first embodiment of the invention. Consequently, two solenoids are actuated in succession whenever one of the 36 attachment push-buttons is operated. However, when switch 92 is moved to terminal 92*b*, no potential is applied to the 36 contacts 38*b*. Consequently, even though the operation of each attachment push-button forces the respective contact 38*b* to bear against a contact on the printed circuit card, the solenoid which is thus "selected" is not energized. Only one solenoid is actuated whenever an attachment push-button is actuated if switch 92 is connected to floating terminal 92*b*; the solenoid which is actuated for each depression of a push-button is the solenoid whose number is at the top of each box in FIG. 10. And since each of these solenoids is disposed over a telephone set push-button which has the same number as the attachment push-button, it is apparent that as each attachment push-button is pressed down, the same numbered telephone set push-button is pressed down. Consequently, the attachment can be used for dialing purposes simply by moving switch 92 to the other of the two positions shown in FIG. 11. After dialing, the switch may be returned to the position shown in FIG. 11 so that data communication can take place.

Although the invention has been described with reference to particular embodiments, it is to be understood that these embodiments are merely illustrative of the application of the principles of the invention. For example, it is contemplated that purely mechanical linkages can be employed in an attachment of the type disclosed in my invention for pressing down two telephone set push-buttons in succession whenever an attachment push-button is operated, thus eliminating the need for the solenoids and the power line. It is also envisioned that batteries could be included in the attachment so that the power line would not be required in an electro-mechanical embodiment of the invention. Also, the attachment can be greatly simplified if the flexibility afforded by interchangeable circuit cards is of no concern. In such a case, each of the push-button mechanisms when operated can control the direct energization of one solenoid followed by the direct energization of another. It is contemplated that similar mechanisms can be constructed to operate a conventional rotary dial telephone. In such a case, the actuation of each attachment push-button would cause the rotary dial to be rotated to a first position corresponding to the first digit to be transmitted, followed by its release, and would then cause the dial to be rotated to a second position corresponding to the second digit to be transmitted, followed by its release. If desired, more than 36 buttons can be provided on the attachment. With a 10-button telephone set, there are 100 different 2-digit codes and thus a maximum of 100 attachment buttons can be employed. Some of these may represent complete messages, e.g., "what is being requested is the bank balance of the customer whose identification code will next be transmitted." There is no need to actuate all of the telephone set push-buttons. For example, only 6 solenoids need be provided for 36 attachment push-buttons since 36 2-digit codes can be constructed from 6 different digits. Also, similar arrangements may be provided so that the operation of any attachment push-button causes 3 or more telephone set push-buttons to be operated in succession. If the attachment mechanism is actually included as part of the telephone set, it is apparent that there results a data terminal whose code can be changed and which can transmit one or two digit codes depending on the position of a control switch. It is also possible to eliminate the need for the control switch by providing extra digit (dialing) buttons, each of which includes only one of contacts 38*a* and 38*b* so as to control the energization of only one respective solenoid. Thus it is to be understood that numerous modifications may be made in the illustrative embodiments of the invention and other arrangements may be devised without departing from the spirit and scope of the invention.

What I claim is:

1. An attachment for a telephone set having a plurality of push-buttons extending therefrom comprising a housing, means for securing said housing to said telephone set in a position such that said telephone set push-buttons are covered thereby, a plurality of push-buttons greater in number than the number of push-buttons on said telephone set extending from said housing and exposed to view when said housing is secured to said telephone set, at least some of the housing push-buttons representing the numerals represented by the telephone set push-buttons, means in said housing for engaging and operating at least some of said telephone set push-buttons, switching means on said housing, and means responsive to the operation of each housing push-button when said switching means is in a first position for controlling said engaging means to operate in succession at least two of said telephone set push-buttons to represent a code uniquely identifiable with said housing push-button and responsive to the operation of a numeral-representing housing push-button when said switching means is in a second position for controlling said engaging means to operate only the respective numeral-representing telephone set push-button.

2. An attachment for a telephone set in accordance with claim 1 further including means for changing the respective sequence of telephone set push-buttons which are operated by said engaging means responsive to the operation of each of said housing push-buttons when said switching means is in said first position.

3. An attachment for a telephone set in accordance with claim 2 wherein said changing means includes a card insertable into said housing.

4. An attachment for a telephone set in accordance with claim 1 wherein said engaging means includes a plurality of electro-mechanical actuators disposed above said telephone set push-buttons, and said controlling means includes contact means responsive to the operation of each of the push-buttons on said housing when said switching means is in said first position for controlling the successive energizations of at least two of said electro-mechanical actuators.

5. An attachment for a telephone set in accordance with claim 1 wherein said engaging means controls successive non-overlapping operations of said telephone set push-buttons when said switching means is in said first position.

6. An attachment for use with a data transmitter having a plurality of push-buttons thereon comprising a housing, means in said housing for operating at least some of said data transmitter push-buttons, a plurality of push-buttons on said housing, switching means on said housing, and means in said housing responsive to the operation of a push-button thereon when said switching means is in a first position for controlling said operating means to operate in succession at least two of said data transmitter push-buttons to represent a code uniquely identifiable with said housing push-button and responsive to the operation of a push-button thereon when said switching means is in a second position for controlling said operating means to operate only one respective data transmitter push-button.

7. An attachment for use with a data transmitter in accordance with claim 6 further including means for changing the respective sequence of data transmitter push-buttons which are operated by said controlling means responsive to the operation of each of said housing push-buttons when said switching means is in said first position

8. An attachment for use with a data transmitter in accordance with claim 7 wherein said changing means includes a card insertable into said housing.

9. A data transmitter comprising means for transmitting items of data, a plurality of manually operable means, at least some of said manually operable means representing respective ones of said items of data, control means for governing two modes of operation of the data transmitter, means responsive to the operation of one of said manually operable means when said control means governs a first mode of operation for controlling said transmitting means to transmit at least two of said items of data in sequence and when said control means governs a second mode of operation for controlling said transmitting means to transmit only the respective one of said items of data for each operation of one of said at least some manually operable means.

10. A data transmitter in accordance with claim 9 wherein for each of said manually operable means said controlling means controls the sequential transmission of at least two sequentially different ones of said items of data when said control means governs said first mode of operation.

11. A data transmitter in accordance with claim 10 wherein said controlling means controls successive non-overlapping transmissions of said items of data.

12. A data transmitter in accordance with claim 10 further including means for changing the respective sequence of items of data which are transmitted responsive to the operations of respective ones of said manually operable means.

13. A data transmitter in accordance with claim 12 wherein said changing means includes a card insertable into the data transmitter.

14. A data transmitter in accordance with claim 9 wherein, when said control means governs said second mode of operation, the operations of said manually operable means control the transmission of telephone dialing information.

15. A combination comprising a plurality of keys each for representing an item of information, a plurality of actuating mechanisms each for moving when operated and each associated with a respective item of information, the number of said keys being greater than the number of said actuating mechanisms, control means for producing two modes of operation, and means responsive to the operation of any one of said keys when said control means produces a first mode of operation for operating in sequence at least two respective ones of said actuating mechanisms to represent a code uniquely identifiable with said one key and responsive to the operation of one of said keys whose respective item of information is associated with one of said actuating mechanisms when said control means produces a second mode of operation for operating only the respective one of said actuating mechanisms.

16. A combination in accordance with claim 15 further including means for controlling a change in the sequences of actuating mechanisms which are operated responsive to the operations of said keys when said control means produces said first mode of operation.

17. A combination in accordance with claim 16 wherein said controlling means is a card.

18. An attachment for a telephone set comprising a housing attachable to said telephone set; said housing having a plurality of key means thereon each for representing a respective item of data; some of said items of data being digits and the number of said key means being substantially greater than the number of distinct data codes which are normally transmitted by said telephone set; switching means; means responsive to said switching means being in a first position for controlling the transmittion of at least two of said data codes for each of said key means which is operated whereby at least two of said data codes are transmitted even when the item of data represented by an operated key means is a digit; and means responsive to said switching means being in a second position for controlling the transmission of only a single data code for each operated one of said key means which represents a dialing digit, the single data code which is transmitted being the data code normally transmitted by the telephone set for the represented digit whereby a telephone number may be dialed when said switching means is in said second position by successively operating the key means which represent the digits in said telephone number while the housing remains attached to the telephone set.

19. An attachment in accordance with claim 18 wherein said housing, when attached to the telephone set, conceals the dialing means provided on said telephone set.

20. A data transmitter for transmitting both dialing information and data over a telephone line comprising a plurality of key means each for representing a respective item of data, some of said items of data being digits and some of said items of data being letters of the alphabet; switching means; means responsive to said switching means being in a first position for controlling the transmission of a data code for each operated one of said key means which represents a digit, which data code is the data code normally transmitted by a telephone set for the represented digit whereby a telephone number may be dialed when said switching means is in said first position by successively operating the key means which represent the digits in a telephone number to be dialed; and means responsive to said switching means being in a second position for controlling the transmission of a respective data code for each operated one of said key means, the data codes transmitted for respective digits being different from the data codes transmitted for such digits when said switching means is in said first position, each of said different data codes being two successive ones of the data codes transmitted when said switching means is in said first position.

* * * * *